(12) United States Patent
Takahashi

(10) Patent No.: US 8,582,118 B2
(45) Date of Patent: Nov. 12, 2013

(54) OPTICAL DETECTING DEVICE, DISPLAY DEVICE, AND ELECTRONIC EQUIPMENT

(75) Inventor: Masaki Takahashi, Suwa (JP)

(73) Assignee: Seiko Epson Corporation (JP)

( * ) Notice: Subject to any disclaimer, the term of this patent is extended or adjusted under 35 U.S.C. 154(b) by 222 days.

(21) Appl. No.: 13/162,901

(22) Filed: Jun. 17, 2011

(65) Prior Publication Data

US 2012/0002215 A1 Jan. 5, 2012

(30) Foreign Application Priority Data

Jun. 30, 2010 (JP) ................................. 2010-148750

(51) Int. Cl.
*G01B 11/24* (2006.01)

(52) U.S. Cl.
USPC ................ 356/614; 345/156; 341/5; 250/221

(58) Field of Classification Search
USPC .......... 356/614–623; 345/156, 179, 173–175; 250/221; 341/5
See application file for complete search history.

(56) References Cited

U.S. PATENT DOCUMENTS

| | | | | |
|---|---|---|---|---|
| 5,107,449 A | * | 4/1992 | Ikuta | 702/159 |
| 5,337,116 A | * | 8/1994 | Nonaka et al. | 396/98 |
| 5,404,021 A | * | 4/1995 | Mangano et al. | 250/559.29 |
| 6,232,595 B1 | * | 5/2001 | Okamuro et al. | 250/231.16 |
| 6,266,142 B1 | * | 7/2001 | Junkins et al. | 356/623 |
| 6,512,507 B1 | | 1/2003 | Furihata et al. | |
| 6,580,066 B2 | * | 6/2003 | Uehira et al. | 250/237 G |
| 6,597,007 B2 | * | 7/2003 | Mizuno et al. | 250/559.38 |
| 2006/0128087 A1 | * | 6/2006 | Bamji et al. | 438/199 |
| 2008/0158174 A1 | * | 7/2008 | Land et al. | 345/173 |
| 2010/0026527 A1 | * | 2/2010 | Nishimura et al. | 341/5 |
| 2010/0328240 A1 | * | 12/2010 | Matsubara | 345/173 |
| 2011/0279827 A1 | * | 11/2011 | Onishi | 356/614 |
| 2011/0304591 A1 | * | 12/2011 | Takahashi et al. | 345/175 |
| 2012/0075641 A1 | * | 3/2012 | Murray et al. | 356/614 |
| 2012/0092296 A1 | * | 4/2012 | Yanase et al. | 345/174 |
| 2013/0027338 A1 | * | 1/2013 | Nishimura et al. | 345/173 |

FOREIGN PATENT DOCUMENTS

| | | |
|---|---|---|
| JP | 11-345085 | 12/1999 |
| JP | 2001-142643 | 5/2001 |

* cited by examiner

*Primary Examiner* — Hoa Pham
(74) *Attorney, Agent, or Firm* — Harness, Dickey & Pierce, P.L.C.

(57) ABSTRACT

An optical detecting device including: an emission unit that emits emitting light; a light-receiving unit that receives the emitting light reflected off an object; an amplifying unit that amplifies a received-light detection signal of the light-receiving unit; a detecting unit that detects position identifying information of the object based on a signal output from the amplifying unit; a determining unit that determines a position of the object based on the position identifying information; and a coupling capacitor provided between an output node of the amplifying unit and an input node of the detecting unit.

20 Claims, 11 Drawing Sheets

OPTICAL DETECTING DEVICE, DISPLAY DEVICE, AND ELECTRONIC EQUIPMENT

This application claims priority to Japanese Patent Application No. 2010-148750 filed Jun. 30, 2010 which is hereby expressly incorporated by reference herein in its entirety.

BACKGROUND

1. Technical Field

The present invention relates to an optical detecting device, a display device, and electronic equipment.

2. Related Art

Recently, a display device provided with a position detecting function in which a touch panel is disposed on the front side of a display section has been used in electronic equipment such as cellular phones, personal computers, car navigation devices, ticket-vending machines, and banking terminals. This display device allows a user to touch an icon or the like in a display image or input information while referring to the image displayed on the display section. Exemplary known position detecting methods using such a touch panel include resistance and capacitance types.

On the other hand, the display area of a projection display device (projector) or a display device for a digital signature is wider than that of the display device of a cellular phone or a personal computer. Therefore, it is difficult to realize position detection by using the above-described resistance-type touch panel or capacitance-type touch panel in such display devices.

Known existing technologies relating to a position detecting device used for a projection display device include, for example, the technologies disclosed in JP-A-11-345085 and JP-A-2001-142643. However, with this type of position detecting device, the system undesirably becomes large-scale. Moreover, when a detection area is wide, a detection signal from a light-receiving element such as a photodiode becomes small. This makes it difficult to obtain sufficient detection accuracy. Furthermore, to improve the detection accuracy, it is necessary to adjust an optical design parameter or a circuit design parameter. This undesirably increases design costs, production costs, etc.

SUMMARY

An advantage of some aspects of the invention is to provide an optical detecting device, a display device, and electronic equipment which can efficiently improve detection accuracy.

According to an aspect of the invention, there is provided an optical detecting device including: an emission unit that emits emitting light; a light-receiving unit that receives at least reflected light by reflecting the emitting light off an object; an amplifying unit that amplifies a received-light detection signal of the light-receiving unit; a detecting unit that outputs position identifying information of the object based on an amplified signal output from the amplifying unit; a determining unit that detect a position of the object based on the position identifying information; and a coupling capacitor provided between an output node of the amplifying unit and an input node of the detecting unit.

According to the aspect of the invention, it is possible to set a capacitance value of the coupling capacitor provided between the output node of the amplifying unit and the input node of the detecting unit according to characteristics of the light-receiving unit or a circuit unit. This makes it possible to improve the detection accuracy efficiently.

Moreover, in the aspect of the invention, the detecting unit may include a circuit for applying a reverse bias voltage and for setting the reverse bias voltage for the input node.

By doing so, when a light-receiving current of the light-receiving unit is high and there is no need to perform amplification, the light-receiving unit is directly connected to the input node, whereby it is possible to operate the light-receiving unit in a state in which the reverse bias voltage is applied to the light-receiving unit. Furthermore, when the light-receiving current of the light-receiving unit is low, it is possible to amplify the received-light detection signal by the amplifying unit and input the amplified signal to the detecting unit.

Moreover, according to the aspect of the invention, the light-receiving unit may be a photodiode, and the reverse bias voltage may be a bias voltage for applying a reverse voltage to the photodiode when the light-receiving unit is connected to the input node.

As a result, it is possible to apply the reverse bias voltage to the photodiode which is the light-receiving unit. This makes it possible to connect the light-receiving unit directly to the input node of the detecting unit. This eliminates the need for the amplifying unit, and makes it possible to simplify the configuration of the device and thereby reduce the production costs.

In addition, in the aspect of the invention, the detecting unit may output light-emitting current control information as the position identifying information, and a capacitance value of the coupling capacitor may be set in such a way that a fluctuation range of the light-emitting current control information becomes a predetermined fluctuation range.

As a result, since the fluctuation range of the light-emitting current control information is set at the predetermined fluctuation range by setting the capacitance value of the coupling capacitor, it is possible to obtain intended detection accuracy.

Moreover, in the aspect of the invention, the predetermined fluctuation range may be a fluctuation range in which detection accuracy with which the object is detected becomes intended detection accuracy.

As a result, by setting the capacitance value of the coupling capacitor, it is possible to obtain intended detection accuracy. This makes it possible to realize intended position detection accuracy without adjusting an optical design parameter or a circuit design parameter.

Furthermore, in the aspect of the invention, the determining unit may determine a position of the object based on first-period light-emitting current control information which is the light-emitting current control information in a first period in which the object is not present in a detection region which is a region in which the object is detected and second-period light-emitting current control information which is the light-emitting current control information in a second period in which the object is present in the detection region.

By doing so, it is possible to eliminate the influence of environmental light such as sunlight and the initial path of the emitting light. This makes it possible to improve detection accuracy.

In addition, in the aspect of the invention, the capacitance value of the coupling capacitor may be set in such a way that a value of the first-period light-emitting current control information becomes a predetermined value.

By doing so, the value of the first-period light-emitting current control information is set at the predetermined value by setting the capacitance value of the coupling capacitor. This makes it possible to ensure intended detection accuracy.

Moreover, in the aspect of the invention, the predetermined value may be an intermediate value of a fluctuation range of the second-period light-emitting current control information.

As a result, by setting the capacitance value of the coupling capacitor, the value of the first-period light-emitting current control information is set at the intermediate value of the predetermined fluctuation range. This makes it possible to ensure intended detection accuracy.

Furthermore, in the aspect of the invention, the capacitance value of the coupling capacitor may be set in such a way that a fluctuation range of the second-period light-emitting current control information becomes a predetermined fluctuation range.

By doing so, since the fluctuation range of the second-period light-emitting current control information is set at the predetermined fluctuation range by setting the capacitance value of the coupling capacitor, it is possible to ensure a predetermined coordinate detection range. This makes it possible to ensure intended detection accuracy.

In addition, in the aspect of the invention, the predetermined fluctuation range may be a fluctuation range in which detection accuracy with which the object is detected becomes intended detection accuracy.

As a result, it is possible to obtain intended detection accuracy by setting the capacitance value of the coupling capacitor. This makes it possible to realize intended position detection accuracy without adjusting an optical design parameter or a circuit design parameter.

Moreover, in the aspect of the invention, the amplifying unit may include a current-voltage conversion circuit converting a current flowing through the light-receiving unit into a voltage, and an amplifying circuit amplifying an output signal of the current-voltage conversion circuit around a predetermined bias voltage and outputting the amplified signal to the output node.

As a result, even if the current flowing through the light-receiving unit is low, it is possible to amplify the received-light detection signal by the amplifying unit and input the amplified signal to the detecting unit. This makes it possible to improve the detection accuracy.

Furthermore, another aspect of the invention relates to a display device and electronic equipment which include the optical detecting device described above.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, a preferred embodiment of the invention will be described in detail. It should be understood that the embodiments described below are not for the purpose of limiting the scope of the invention as defined by the claims, and all the configurations described in the embodiments are not essential prerequisites of the invention.

1. Optical Detecting Device

Figure 1:
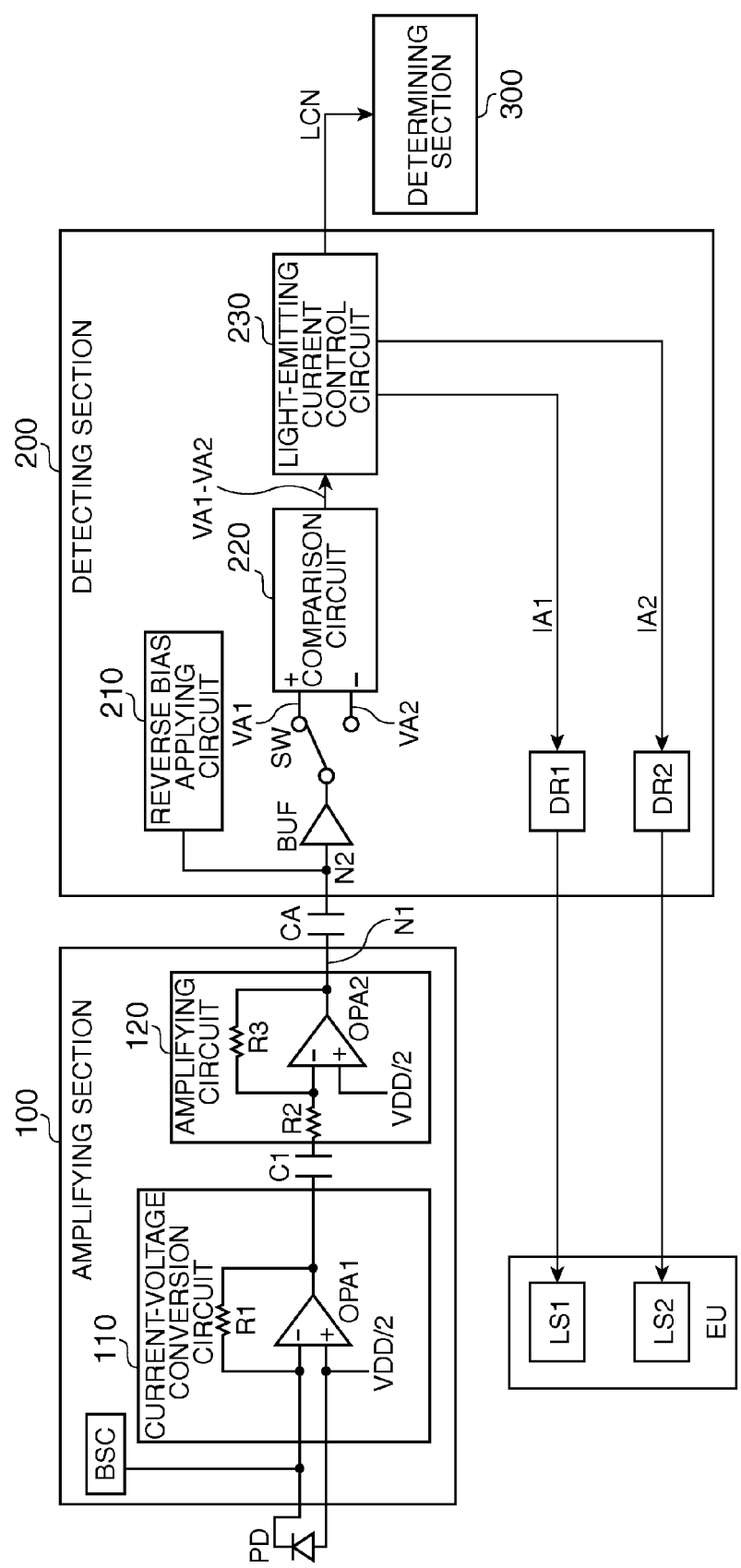
FIG. 1 illustrates the basic configuration of an optical detecting device.
Figure 2:
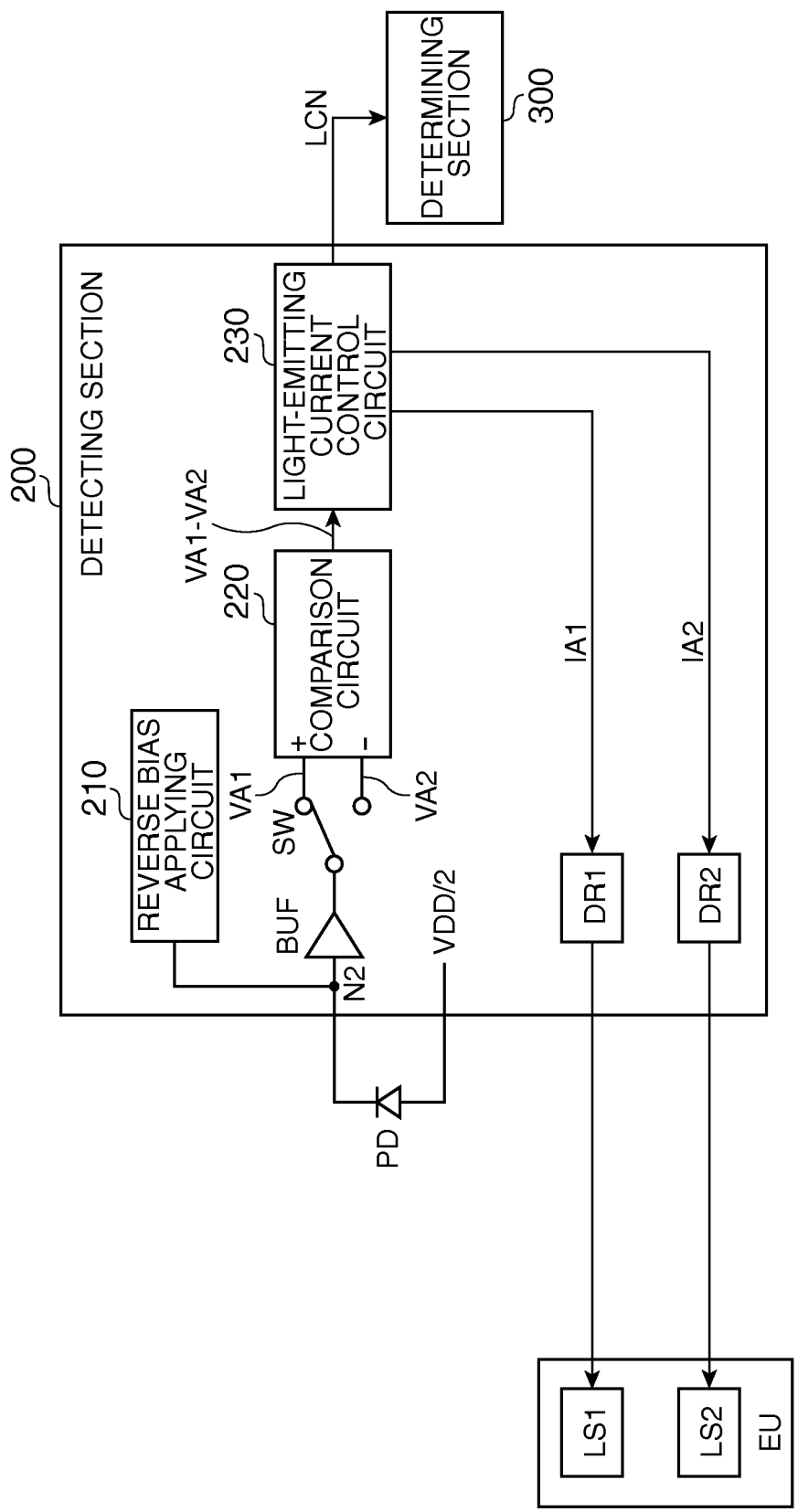
FIG. 2 illustrates the configuration which does not include an amplifying section of the optical detecting device.

In FIG. 1, a basic configuration example of an optical detecting device of this embodiment is shown. The optical detecting device of this embodiment includes an emission section EU, a light-receiving element PD, an amplifying section 100, a detecting section 200, a determining section 300, and a coupling capacitor CA. The optical detecting device of this embodiment is not limited to the configuration shown in FIG. 1, and various modifications are possible by omitting part of the component elements thereof, replacing a component element with another, or adding another component element thereto. For example, the optical detecting device of this embodiment may have a configuration which does not include the amplifying section 100 as shown in FIG. 2.

The emission section EU includes first and second light source sections LS1 and LS2 and emits emitting light. That is, the light source sections LS1 and LS2 emit the emitting light. The light source sections LS1 and LS2 each include a light-emitting element such as an LED (light-emitting diode) and emit, for example, infrared light (near-infrared light close to the visible light range).

The light-receiving element PD receives at least reflected light by reflecting the emitting light off an object. As the light-receiving element PD, a photodiode or a phototransistor can be used.

The amplifying section 100 amplifies a received-light detection signal of the light-receiving element PD and outputs the signal to an output node N1. The amplifying section 100 includes a current-voltage conversion circuit 110, an amplifying circuit 120, and a reverse bias setting circuit BSC. The current-voltage conversion circuit 110 includes an operational amplifier OPA1 and a resistance element R1, converts a current flowing through the light-receiving element PD into a voltage, and outputs a signal (received-light detection signal) in which a voltage level of its center is, for example, a half (½) of a high-potential power-supply voltage VDD. The received-light detection signal is input to the amplifying circuit 120 via a capacitor C1. The amplifying circuit 120 includes an operational amplifier OPA2 and resistance elements R2 and R3, amplifies the received-light detection signal, and outputs a signal to the output node N1. A voltage level of a center of the signal is, for example, a half of the VDD (in a broad sense, predetermined bias voltage) which is ½×VDD. The reverse bias setting circuit BSC applies a reverse bias voltage to the light-receiving element PD (photodiode).

The detecting section 200 detects position identifying information of the object based on the signal which has been output from the amplifying section 100, and outputs information to the determining section 300. The detecting section 200 includes a reverse bias applying circuit 210, a buffer circuit BUF, a switch circuit SW, a comparison circuit 220, a light-emitting current control circuit 230, and two drive circuits DR1 and DR2.

The reverse bias applying circuit 210 is a circuit (circuit for applying a reverse bias voltage) that can set a reverse bias voltage at an input node N2 and that can, for example, apply a high-potential power-supply voltage VDD to the input node N2. The reverse bias voltage is a bias voltage for applying a reverse voltage to the photodiode when the light-receiving element PD is connected to the input node N2. By using the reverse bias applying circuit 210, it is possible to connect the light-receiving element PD directly to the input node N2 without involving the amplifying section 100. That is, when the light-receiving current of the light-receiving element PD is high and there is no need to perform amplification as shown in FIG. 2, the light-receiving element PD is directly connected to the input node N2. Therefore, it is possible to operate the light-receiving element PD in a state in which the reverse bias voltage is applied to the light-receiving element PD. On the other hand, when the light-receiving current of the light-receiving element PD is low as shown in FIG. 1, it is possible to convert the light-receiving current into a voltage and perform amplification by the amplifying section 100 and input the amplified signal to the input node N2 via the coupling capacitor CA.

As shown in FIG. 1, by amplifying the received-light detection signal through the amplifying section 100 and inputting the amplified signal to the detecting section 200, light-emitting current control by the light-emitting current control circuit 230 is appropriately performed even if the detection region is wide and the light-receiving current from the light-receiving element PD is low. Therefore, it is possible to obtain intended detection accuracy. Moreover, when the light-receiving current of the light-receiving element PD is high as shown in FIG. 2, the light-receiving element PD is directly connected to the input node N2. This eliminates the need for the amplifying section 100, and makes it possible to simplify the configuration of the device and thereby reduce the production costs. As described above, it is possible to obtain intended detection accuracy efficiently according to the characteristics of the light-receiving element PD or the size of the detection region by using the optical detecting device of this embodiment.

The switch circuit SW outputs the received-light detection signal buffered by the buffer circuit BUF through switching between one input node (+) and another input node (−) of the comparison circuit 220. Specifically, when the first light source section LS1 emits light, the switch circuit SW outputs the received-light detection signal to the input node (+). When the second light source section LS2 emits light, the switch circuit SW outputs the received-light detection signal to the input node (−).

The comparison circuit 220 compares the received-light detection signal input to the input node (+) and the received-light detection signal input to the input node (−), and outputs the result thus obtained to the light-emitting current control circuit 230. Specifically, when a received-light detection signal VA1, which is generated when LS1 emits light, is input to the input node (+) and a received-light detection signal VA2, which is generated when LS2 emits light, is input to the input node (−), the comparison circuit 220 outputs a signal corresponding to the difference between the two received-light detection signals VA1 and VA2, i.e., VA1−VA2.

The light-emitting current control circuit 230 performs light-emitting control of the light source sections LS1 and LS2 based on the signal from the comparison circuit 220. Specifically, based on the comparison result of the comparison circuit 220 (the difference between the received-light detection signals VA1 and VA2), the light-emitting current control circuit 230 outputs light-emitting current control information LCN for setting currents (light-emitting currents) which flow through the two light source sections LS1 and LS2 in such a way that the two received-light detection signals (for example, VA1 and VA2) become equal. The light-emitting current control information LCN includes, for example, a current set value IA1 for setting the light-emitting current of LS1 and a current set value IA2 for setting the light-emitting current of LS2. The details of the light-emitting current control will be described later.

The determining section 300 determines a position of an object based on the position identifying information (light-emitting current control information LCN) output from the detecting section 200. Specifically, the determining section 300 determines the positional relationship between the first and second light source sections LS1 and LS2 and an object OB based on first-period light-emitting current control information LCNinit and second-period light-emitting current control information LCNdet. The first-period light-emitting current control information LCNinit is light-emitting current control information in a first period (initial state period) in which the object OB is not present in a detection region. The second-period light-emitting current control information LCNdet is light-emitting current control information in a second period (detection period) in which the object OB is present in the detection region. A method for determining the positional relationship by using the light-emitting current control information will be described later.

The detection region is a region in which an object is detected. Specifically, it is a region in which the object OB can be detected by receiving the reflected light with the light-receiving element PD, the reflected light by reflecting the emitting light off the object OB. More specifically, the detection region is a region in which the object OB can be detected by receiving the reflected light with the light-receiving element PD and, as the detection accuracy thereof, acceptable accuracy can be ensured.

The coupling capacitor CA is provided between the output node N1 of the amplifying section 100 and the input node N2 of the detecting section 200. The coupling capacitor CA prevents the bias voltage (reverse bias voltage) which is applied to the input node N2 from being applied to the output node N1 of the amplifying section 100. That is, the coupling capacitor CA allows the received-light detection signal which is an alternating-current component to pass therethrough and blocks the bias voltage which is a direct-current component.

When a capacitance value of the coupling capacitor CA changes, the variation range of the light-emitting current control information LCN (the range of a value which the light-emitting current control information LCN can take) changes. The reason is as follows. When the capacitance value of CA is large, a change in the voltage level of the input node N2 becomes large. When the capacitance value of CA is small, a change in the voltage level of the input node N2 becomes small. When the variation range of LCN changes, a fluctuation range (coordinate detection range) thereof also changes. Since the object position detection accuracy depends on the fluctuation range of LCN, it is necessary to set the fluctuation range of the light-emitting current control information LCN at a predetermined fluctuation range in order to obtain intended position detection accuracy.

As will be described later, with the optical detecting device of this embodiment, it is possible to set the capacitance value of the coupling capacitor CA such that the fluctuation range of the light-emitting current control information LCN becomes a predetermined fluctuation range. Here, the fluctuation range of LCN is a difference between a value (digital value) of LCN when the object is present at one end of the detection region and a value of LCN when the object is present at the other end of the detection region. Therefore, the larger the fluctuation range is, the more the steps (the number of steps) the value (digital value) of LCN corresponding to the coordinate value of the object has and the higher the position detection accuracy becomes. The predetermined fluctuation range is a fluctuation range required for ensuring intended position detection accuracy. The fluctuation range of the light-emitting current control information LCN will be described specifically by using FIGS. 7A to 9A which will be described later.

The drive circuits DR1 and DR2 generate the light-emitting currents based on the current set values IA1 and IA2 from the light-emitting current control circuit 230 and supply the light-emitting current to the light source sections LS1 and LS2.

Figure 3:
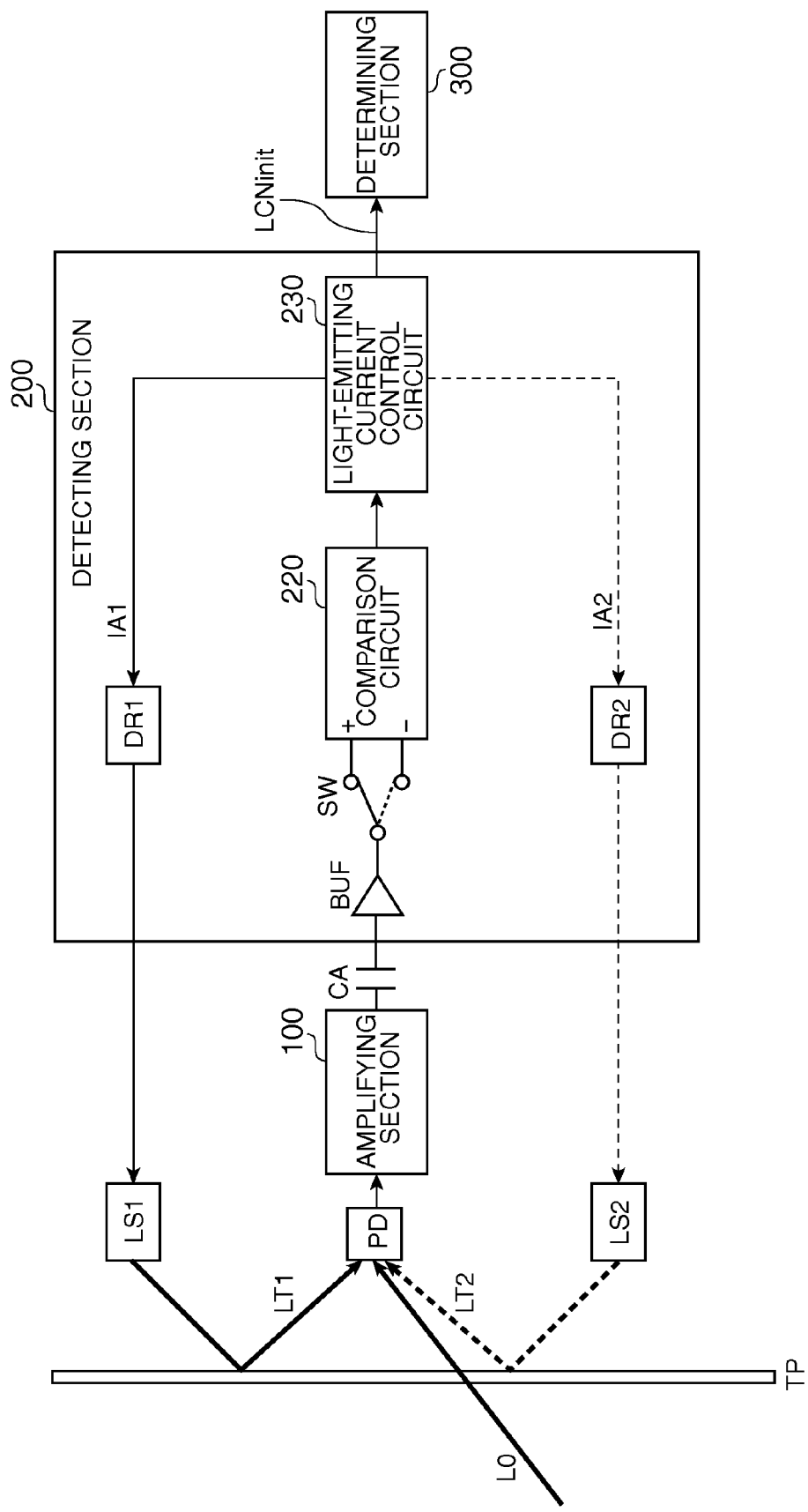
FIG. 3 is a diagram explaining light-emitting current control in a first period.

FIG. 3 is a diagram explaining the light-emitting current control in the first period, that is, the period in which the object is not present in the detection region. As shown in FIG. 3, the light-emitting current control circuit 230 makes LS1 and LS2 emit light alternately. The light-receiving element PD receives emitting light LT1 from LS1 when LS1 emits light and receives emitting light LT2 from LS2 when LS2 emits light. Furthermore, the light-receiving element PD receives outside light (environmental light) L0 such as sunlight. In FIG. 3, a configuration example including a light-transmissive member TP is shown. However, a light-transmissive member TP may be omitted.

The light-emitting current control circuit 230 performs the light-emitting control in such a way that the result of the received light obtained when LS1 emits light is equal to the result of the received light obtained when LS2 emits light. Specifically, based on the comparison result of the comparison circuit 220 (the difference between the received-light detection signals), the light-emitting current control circuit 230 sets the current set values IA1 and IA2 of the light-emitting currents of LS1 and LS2, respectively, in such a way that the difference is closer to 0. Then, the light-emitting current control circuit 230 outputs, to the determining section 300, the light-emitting current control information obtained when the two results of the received light become equal as the first-period light-emitting current control information LCNinit.

Figure 4:
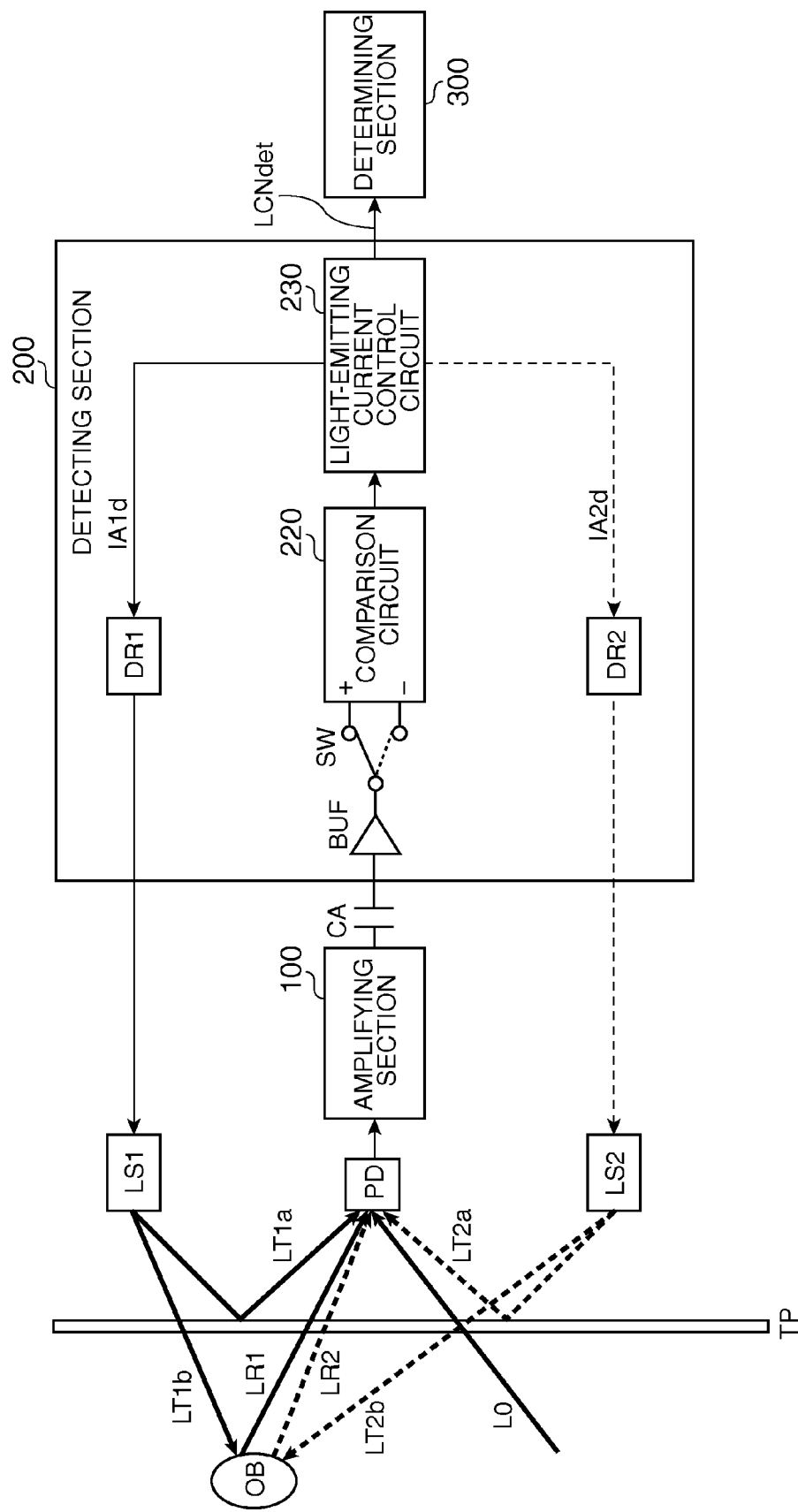
FIG. 4 is a diagram explaining light-emitting current control in a second period.

FIG. 4 is a diagram explaining the light-emitting current control in the second period, that is, the period in which the object OB is present in the detection region. As shown in FIG. 4, the light-emitting current control circuit 230 makes LS1 and LS2 emit light alternately. The light-receiving element PD receives emitting light LT1a from LS1 and a reflected light LR1 by reflecting the emitting light LT1b off the object OB when LS1 emits light, and receives emitting light LT2a from LS2 and a reflected light LR2 by reflecting the emitting light LT2b off the object OB when LS2 emits light. Furthermore, the light-receiving element PD receives outside light (environmental light) L0 such as sunlight. In FIG. 4, a configuration example including a light-transmissive member TP is shown. However, a light-transmissive member TP may be omitted.

The light-emitting control performed in the second period, that is, the period in which the object is present in the detection region is the same as the above-described light-emitting control performed in the first period. That is, the light-emitting current control circuit 230 performs the light-emitting control by making LS1 and LS2 emit light alternately in such away that the result of the received light obtained when LS1 emits light is equal to the result of the received light obtained when LS2 emits light. Specifically, based on the comparison result of the comparison circuit 220 (the difference between the received-light detection signals), the light-emitting current control circuit 230 sets current set values $IA1d$ and $IA2d$ of the light-emitting currents of LS1 and LS2, respectively, in such a way that the difference is closer to 0. Then, the light-emitting current control circuit 230 outputs, to the determining section 300, the light-emitting current control information obtained when the two results of the received light become equal as the second-period light-emitting current control information LCNdet.

The determining section 300 determines a position of the object OB based on the first-period light-emitting control information LCNinit and the second-period light-emitting control information LCNdet. Specifically, based on the current set values IA1, IA2, $IA1d$, and $IA2d$, the determining section 300 can determine the positional relationship between the light source sections LS1 and LS2 and the object OB by the following equation.

$$FR = FA1/FA2 = F(LOB1)/F(LOB2) = (IA1 \times IA2d)/(IA2 \times IA1d)$$

Here, FR is the ratio between a value FA1 of a distance function F (LOB1) and a value FA2 of a distance function F (LOB2). Moreover, the distance function F(LOB1) is a distance function representing the positional relationship between the object OB and the first light source section LS1, and the distance function F(LOB2) is a distance function representing the positional relationship between the object OB and the second light source section LS2.

A distance function F(L) is a function representing light attenuation in a certain light path L. When the light source is a point source, for example, the distance function F(L) is a function which is inversely proportional to the square of the distance L. The distance function F(L) can actually be determined with consideration given to the positional relationship between the light source sections LS1 and LS2 and the light-receiving element PD, the presence or absence of the light-transmissive member TP, and the like.

As described above, by determining the position of the object OB based on the first-period light-emitting control information LCNinit and the second-period light-emitting control information LCNdet, it is possible to eliminate the influence of the outside light (environmental light) L0 and the initial paths LT1a and LT2a of the emitting light.

Figure 5:
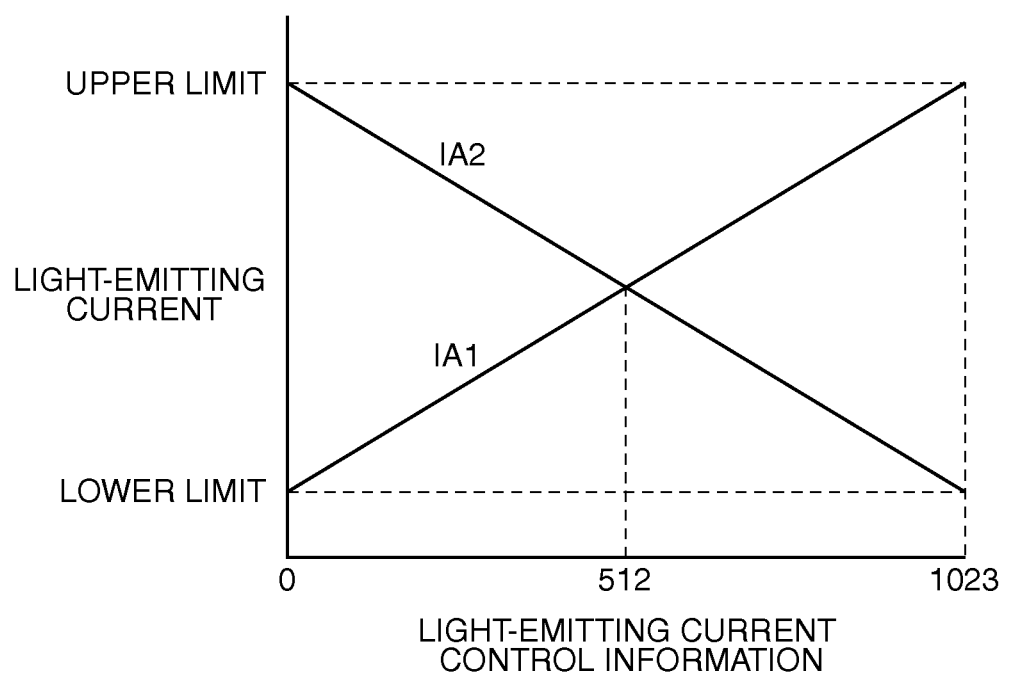
FIG. 5 is a diagram explaining the relationship between light-emitting current control information and light-emitting current.

FIG. 5 is a diagram explaining the relationship between light-emitting current control information LCN and a light-emitting current. The horizontal axis of FIG. 5 indicates the light-emitting current control information LCN represented by 10-bit digital values (0 to 1023). Moreover, the vertical axis of FIG. 5 indicates the range (upper limit and lower limit) of a current value controlled by the light-emitting current control circuit 230. For example, when LCN is 0, IA1 is set at the lower limit and IA2 is set at the upper limit. Furthermore, when LCN is 512, both IA1 and IA2 are set at a median value (value intermediate between the upper limit and the lower limit), and, when LCN is 1023, IA1 is set at the upper limit and IA2 is set at the lower limit.

As described earlier, based on the comparison result of the comparison circuit 220 (the difference between the received-light detection signals), the light-emitting current control circuit 230 adjusts the current values IA1 and IA2 of the light-emitting currents of LS1 and LS2 in such a way that the difference is closer to 0. That is, the light-emitting current control circuit 230 makes the difference between the received-light detection signals closer to 0 by increasing one of IA1 and IA2 and decreasing the other. In this way, the value of the light-emitting current control information LCN is determined on one value within the range of 0 to 1023.

In the first period, that is, the period in which the object OB is not present in the detection region, there is no reflected light from the object OB. Therefore, theoretically, the distance (light path) from the first light source section LS1 to the light-receiving element PD is equal to the distance (light path) from the second light source section LS2 to the light-receiving element PD. When LS1 and LS2 are equal in luminous efficiency, the first-period light-emitting current control information LCNinit is set at 512. This is because IA1 and IA2 are set at equal values.

In reality, it is difficult to make IA1 strictly equal to IA2 due to variations in the luminous efficiency of the light source sections and the positional relationship between the light source section and the light-receiving element. However, in order to ensure position detection accuracy, it is desirable that, as described above, the first-period light-emitting current control information LCNinit be set at a value close to a center value (for example, 512) (in a broad sense, an intermediate value of a predetermined fluctuation range of the light-emitting current control information LCN).

In the second period, that is, the period in which the object OB is present in the detection region, the value of the second-period light-emitting current control information LCNdet varies depending on the position of the object OB. For example, the closer to the first light source section LS1 the object OB is and the distant from the second light source section LS2 the object OB is, the closer to 0 the value of LCNdet is. This is because IA2 is set at a large value and IA1 is set at a small value. On the other hand, the closer to the second light source section LS2 the object OB is and the distant from the first light source section LS1 the object OB is, the closer to 1023 the value of LCNdet is. This is because IA1 is set at a large value and IA2 is set at a small value.

The more the steps (the number of steps) the digital value (for example, 0 to 1023) representing the light-emitting current control information LCN has, the higher the position detection accuracy becomes. For example, when the X coordinate value of the detection region is within the range of 0 to XA and the number of steps of LCN corresponding to the X coordinate value is N, the position detection accuracy is XA/N. Therefore, in FIG. 5, the highest accuracy is obtained when N=1024. That is, the highest accuracy is obtained when the value of LCN is 0 when the object OB is present at one end (for example, the X coordinate value is 0) of the detection region and the value of LCN is 1023 when the object OB is present at the other end (for example, the X coordinate value is XA) of the detection region.

As described above, the wider the fluctuation range (coordinate detection range) of the second-period light-emitting current control information LCNdet when the object OB moves from one end of the detection region to the other end thereof, that is, the closer to the widest possible fluctuation range (for example, 0 to 1023) the fluctuation range is, the higher the position detection accuracy is. Moreover, it is desirable to set the value of the first-period light-emitting current control information LCNinit to a value close to a center value (for example, 512) of the variation range of the second-period light-emitting current control information LCNdet.

As described above, in the optical detecting device of this embodiment, by changing the capacitance value of the coupling capacitor CA, it is possible to change the variation ranges of LCNinit and LCNdet (the ranges of values which the light-emitting current control information LCNinit and LCNdet can take). Therefore, according to the optical detecting device of this embodiment, it is possible to set the capacitance value of the coupling capacitor CA in such a way that the value of the first-period light-emitting current control information LCNinit becomes a predetermined value. Moreover, it is possible to set the capacitance value of the coupling capacitor CA in such a way that the fluctuation range (coordinate detection range) of the second-period light-emitting current control information LCNdet becomes a predetermined fluctuation range. The predetermined value and the predetermined fluctuation range can be determined according to required position detection accuracy.

As described above, according to the optical detecting device of this embodiment, even if the detection region is wide and the light-receiving current from the light-receiving element PD is small, it is possible to obtain intended detection accuracy by amplifying the received-light detection signal by the amplifying section 100. Furthermore, since the fluctuation range of the light-emitting current control information LCN can be set at a predetermined fluctuation range by changing the capacitance value of the coupling capacitor CA, it is possible to realize intended position detection accuracy without adjusting an optical design parameter or without adjusting a circuit design parameter such as a parameter set in designing the comparison circuit or the light-emitting current control circuit. As a result, it is possible to improve the position detection accuracy efficiently while preventing an increase in design costs, production costs, etc.

Moreover, according to the optical detecting device of this embodiment, when the light-receiving current of the light-receiving element PD is large, the signal from the light-receiving element can be directly input to the detecting section. This eliminates the need for an amplifying section and makes it possible to simplify the configuration of the device, whereby it is possible to reduce production costs. As a result, it is possible to obtain intended detection accuracy efficiently according to the characteristics of light-receiving elements or the size of a detection region.

Figure 6:
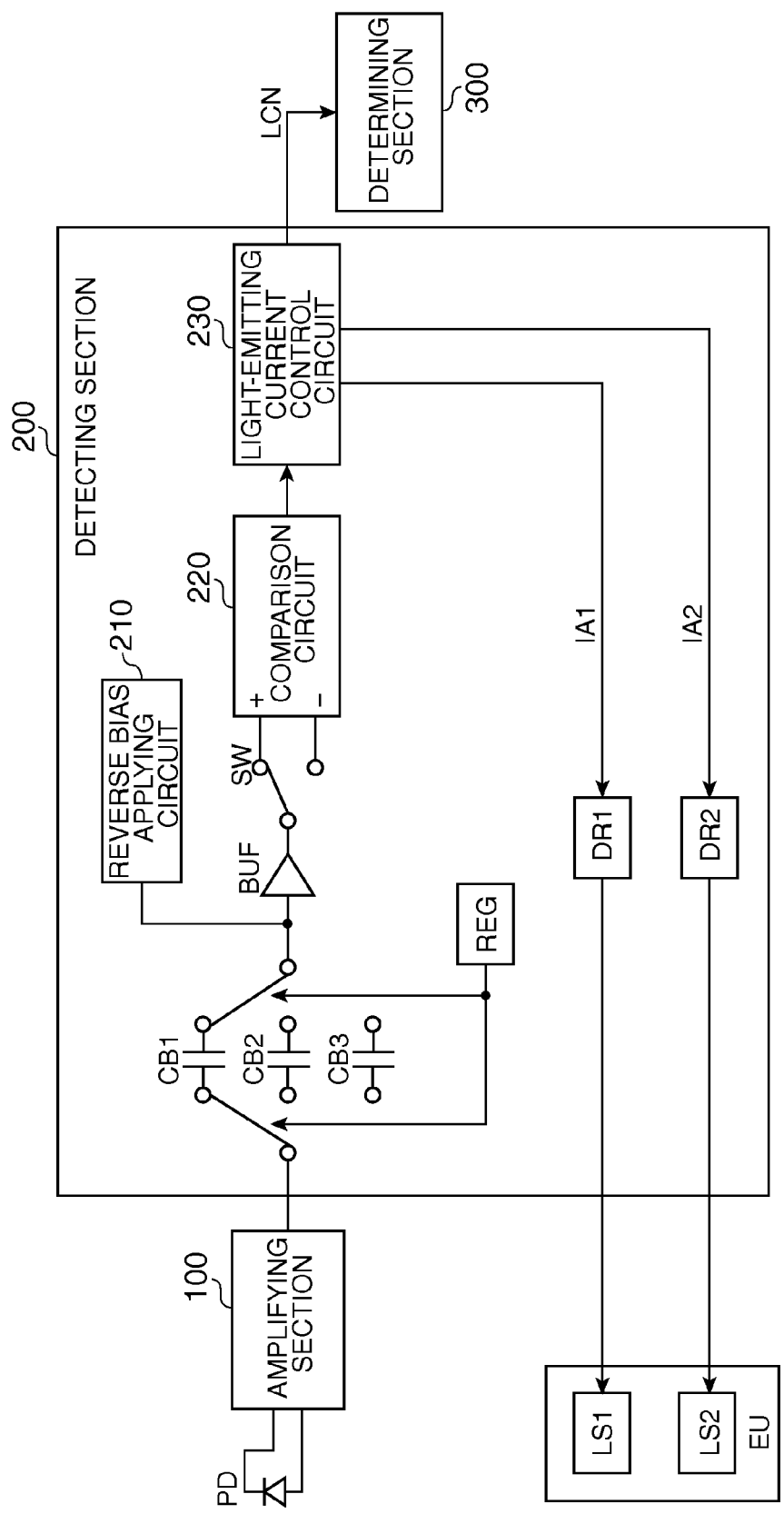
FIG. 6 illustrates another modified configuration of an optical detecting device.

In FIG. 6, a modified example of the optical detecting device of this embodiment is shown. This modified example includes coupling capacitors CB1 to CB3, and can select any one of CB1 to CB3 and connect the selected capacitor based on a register value of a register REG. This makes it possible to set a capacitance value of the coupling capacitor in such a way that the capacitance value can be changed. As a result, it is possible to set the capacitance value at an optimum value according to variations in the characteristics of an optical system or variations in the characteristics of a circuit element. The number of coupling capacitors in FIG. 6 is not limited to three. Four or more coupling capacitors may be included.

Figure 7A:
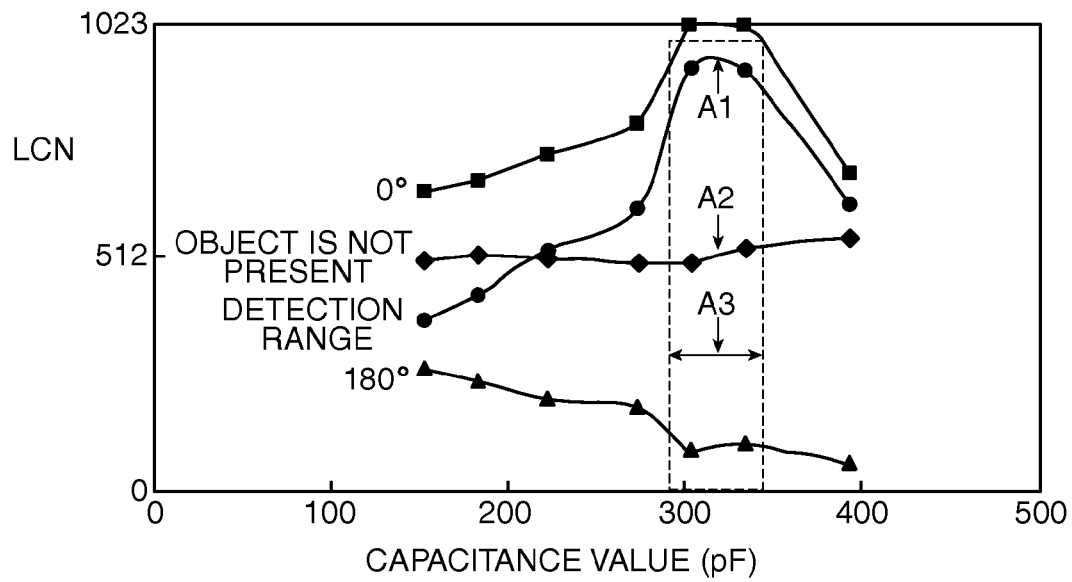
FIGS. 7A and 7B are diagrams showing a first example of the relationship between a capacitance value of a coupling capacitor and light-emitting current control information.

FIG. 7A is a diagram showing a first example of the relationship between capacitance values of the coupling capacitor CA and the light-emitting current control information LCN. The first example was measured by using the emission section EU and the light-receiving section RU (the light-receiving element PD) shown in FIG. 7B.

The emission section EU emits emitting light whose intensity varies according to an angle (0° to 180°) with respect to a center position PE. That is, when the light source section LS1 emits light, the emission section EU emits emitting light having an intensity distribution pattern in which the intensity becomes the highest with respect to an angle of 0° and the intensity becomes the lowest with respect to an angle of 180°. Moreover, when the light source section LS2 emits light, the emission section EU emits emitting light having an intensity distribution pattern in which the intensity becomes the lowest with respect to an angle of 0° and the intensity becomes the highest with respect to an angle of 180°. The light-receiving element PD is provided at the center position PE or near the center position PE. With such the configuration, it is possible to detect a direction in which an object is present (angle at which the object is present). The detailed configuration of the emission section EU will be described later.

FIG. 7A shows values of LCN (LCNinit) when no object is present, values of LCN (LCNdet) when the object is present at an angle of 0° and an angle of 180°, and the detection range (fluctuation range of LCNdet). The detection range becomes the widest at A1 as shown in FIG. 7A. The value of LCNinit becomes nearly a center value 512 at A2 as shown in FIG. 7A. Therefore, the capacitance value of the coupling capacitor CA simply has to be set in the range of the capacitance value indicated by A3 as shown in FIG. 7A.

Figure 8A:
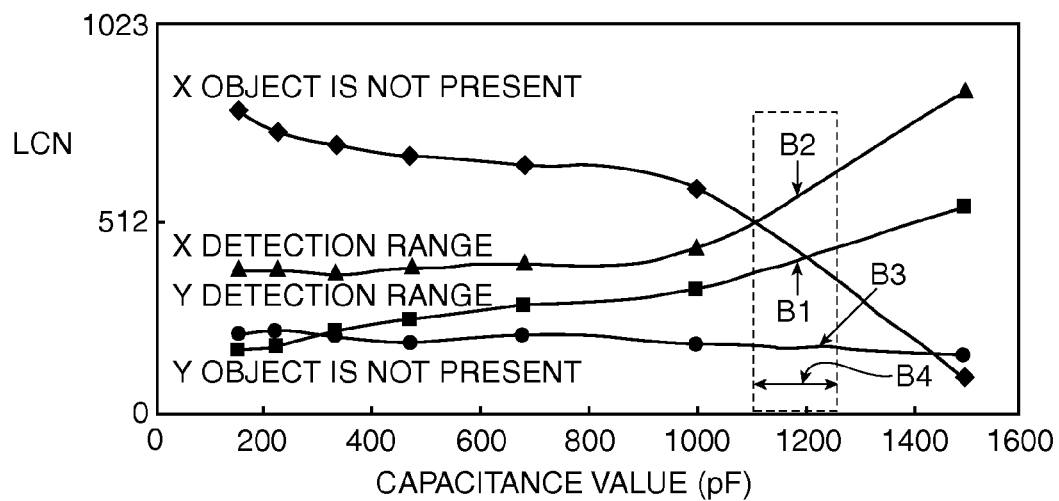
FIGS. 8A and 8B are diagrams showing a second example of the relationship between a capacitance value of a coupling capacitor and light-emitting current control information.
Figure 8B:
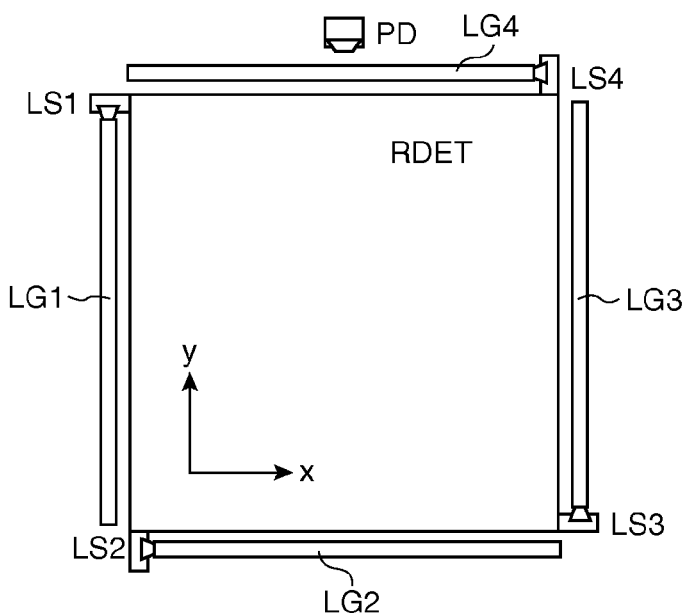

FIG. 8A is a diagram showing a second example of the relationship between capacitance values of the coupling capacitor CA and the light-emitting current control information LCN. The second example was measured by using light source sections LS1 to LS4 and the light-receiving element PD shown in FIG. 8B. In this configuration, light guides LG1 to LG4 are provided on the sides of a detection region RDET. The light source section LS1 and the linear light guide LG1 form one emission section. Emitting light exits from the light guides LG1 to LG4 in respective directions, each being perpendicular to a corresponding side, the directions in which the light travel toward the inside of the detection region RDET. Light-emitting current control is performed in such a way that, at the time of detection of an X coordinate of the object, LS1 and LS3 emit light alternately. And, at the time of detection of a Y coordinate of the object, LS2 and LS4 emit light alternately.

FIG. 8A shows the values of LCN (LCNinit) when no object is present and the detection ranges (fluctuation ranges of LCNdet) when the object is present, the values and the detection ranges at the time of detection of the X coordinate and at the time of detection of the Y coordinate. The value of LCNinit for the X coordinate and the value of LCNinit for the Y coordinate become almost the same at B1 as shown in FIG. 8A. The detection range of the X coordinate becomes about 570 at B2 as shown in FIG. 8A. The detection range of the Y coordinate becomes about 180 at B3 as shown in FIG. 8A. Although the detection range of the X coordinate does not become the widest at B2 as shown in FIG. 8A, it is desirable to set the capacitance value of the coupling capacitor CA at a range (B4 of FIG. 8A) of the capacitance value. The ranges in which the value of LCNinit for the X coordinate and the value of LCNinit for the Y coordinate become almost the same.

Figure 9A:
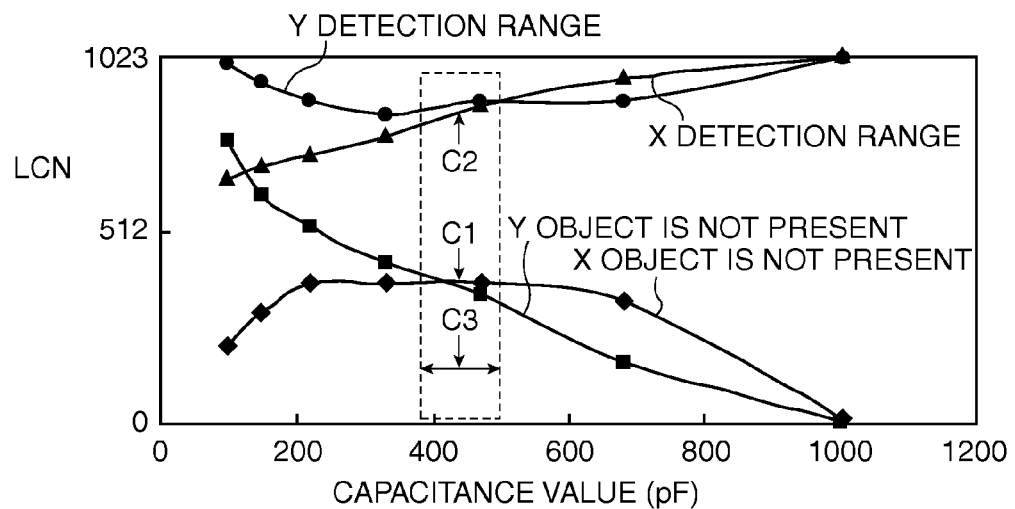
FIGS. 9A and 9B are diagrams showing a third example of the relationship between a capacitance value of a coupling capacitor and light-emitting current control information.
Figure 9B:
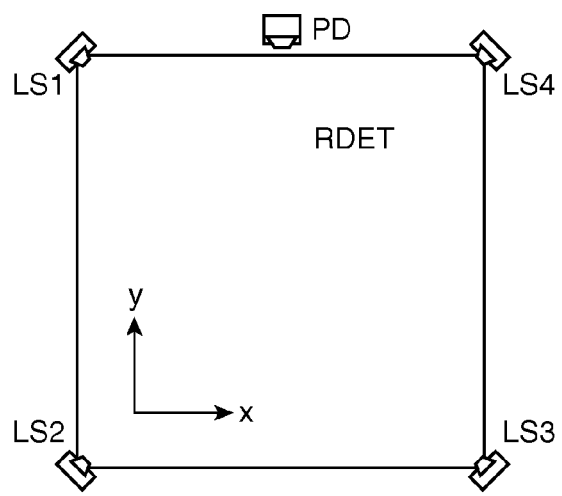

FIG. 9A is a diagram showing a third example of the relationship between the capacitance value of the coupling capacitor CA and the light-emitting current control information LCN. The third example was measured by using light source sections LS1 to LS4 and the light-receiving element PD shown in FIG. 9B. In this configuration, the light source sections LS1 to LS4 are provided at the corners of the detection region RDET. Light-emitting current control is performed in such a way that at the time of detection of an X coordinate, LS1 and LS3 emit light alternately; and at the time of detection of a Y coordinate, LS2 and LS4 emit light alternately.

FIG. 9A shows the values of LCN (LCNinit) when no object is present and the detection ranges (the fluctuation ranges of LCNdet) when the object is present, the values and the detection ranges at the time of detection of the X coordinate and at the time of detection of the Y coordinate. The value of LCNinit for the X coordinate and the value of LCNinit for the Y coordinate become almost the same at C1 as shown in FIG. 9A. The detection range of the X coordinate and the detection range of the Y coordinate take almost the same value at C2 as shown in FIG. 9A. Although this value is not the largest value of the detection range, it is a sufficiently large value. As described above, when the detection range of the X coordinate and the detection range of the Y coordinate take almost the same value, the detection accuracy for the X coordinate and the detection accuracy for the Y coordinate become almost the same. Therefore, it is necessary simply to set the capacitance value of the coupling capacitor CA in a range of the capacitance value, the range indicated by C3 as shown in FIG. 9A.

As described above, in the optical detecting device of this embodiment, by changing the capacitance value of the coupling capacitor CA, it is possible to change the variation ranges of LCNinit and LCNdet (ranges of values which LCNinit and LCNdet can take). Therefore, according to the optical detecting device of this embodiment, it is possible to set the capacitance value of the coupling capacitor CA in such a way that the value of the first-period light-emitting current control information LCNinit becomes a predetermined value, that is, an intermediate value of the fluctuation range (coordinate detection range) of the second-period light-emitting current control information. Here, the intermediate value of the fluctuation range includes not only a center value of the fluctuation range but also a value close to the center value. For example, the intermediate value of the fluctuation range may include a range from a value which is smaller than the center value by ¼ of the fluctuation range to a value which is larger than the center value by ¼ of the fluctuation range. Moreover, it is possible to set the capacitance value of the coupling capacitor CA in such a way that the fluctuation range of the second-period light-emitting current control information LCNdet becomes a predetermined fluctuation range, that is, a fluctuation range in which intended detection accuracy can be ensured.

2. Emission Section

Figure 7B:
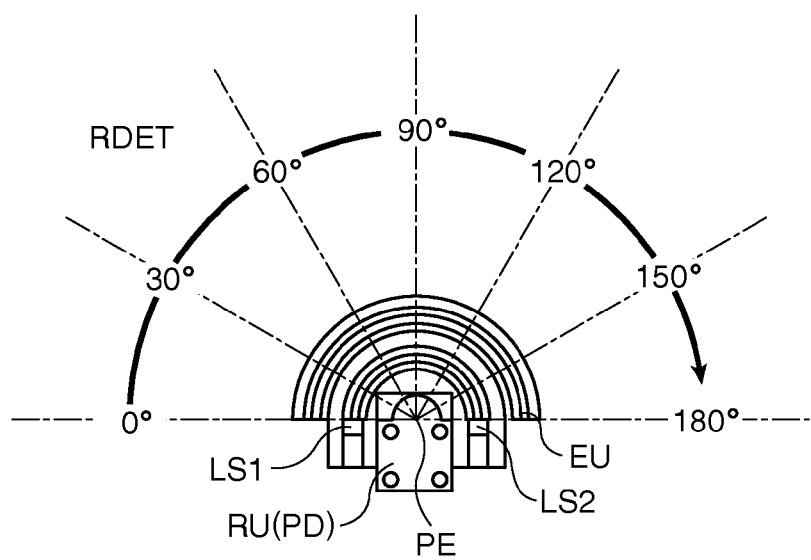
Figure 10:
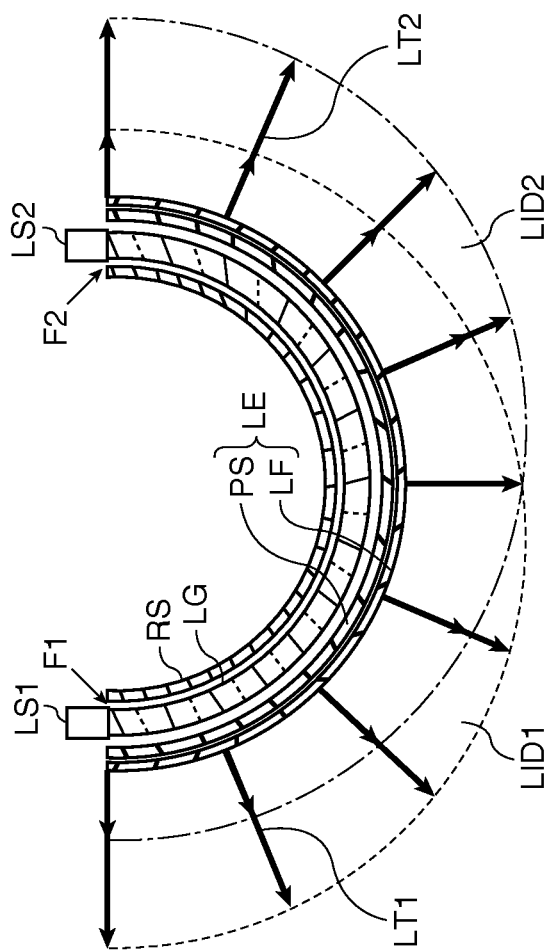
FIG. 10 illustrates a detailed configuration of an emission section.

FIG. 10 shows a detailed configuration example of the emission section EU shown in FIG. 7B. The emission section EU of the configuration in FIG. 10 includes light source sections LS1 and LS2, a light guide LG, and an emitting direction setting section LE. Moreover, the emission section EU includes a reflecting sheet RS. In addition, the emitting direction setting section LE includes a prism sheet (optical sheet) PS and a louver film LF. It is to be understood that the emission section EU of this embodiment is not limited to the configuration shown in FIG. 10. Various modifications are possible by omitting part of the component elements thereof, replacing a component element with another, or adding another component element thereto.

The light source sections LS1 and LS2 emit a source light and each have a light emitting element such as an LED (light-emitting diode). The light source sections LS1 and LS2 may emit a source light of infrared light (near-infrared light close to the visible light range). That is, it is desirable that the source light emitted from the light source sections LS1 and LS2 be light in a wavelength band which is efficiently reflected from an object such as a finger of the user or a touch pen, or light in a wavelength band which is seldom contained in environmental light, i.e. ambient light. Specifically, the source light emitted from the light source sections LS1 and LS2 is infrared light of a wavelength near 850 nm, which is light in a wavelength band with a high degree of reflection on the surface of a human body, or infrared light near 950 nm, which is light in a wavelength band which is seldom contained in environmental light.

The light source section LS1 is provided at one end of the light guide LG as indicated by F1 as shown in FIG. 10. Moreover, the second light source section LS2 is provided at the other end of the light guide LG as indicated by F2. As a result of the light source section LS1 emitting a source light toward the light entrance face at one end (F1) of the light guide LG, emitting light LT1 exits. It forms (sets) a first emitting light intensity distribution LID1 in an object detection area. On the other hand, as a result of the light source section LS2 emitting a second source light toward the light entrance face at the other end (F2) of the light guide LG, a second emitting light LT2 exits. It forms a second emitting light intensity distribution LID2 having an intensity distribution which is different from that of the first emitting light intensity distribution LID1 in the detection area. In this way, the emission section EU can emit emitting light with different intensity distributions in accordance with a position in the detection region RDET.

The light guide LG (light guiding member) guides the source light emitted from the light source sections LS1 and LS2. For example, the light guide LG guides the source light from the light source sections LS1 and LS2 along a curved light guiding path, and has a curved shape. Specifically, in FIG. 10, the light guide LG is shaped like an arc. In FIG. 10, the light guide LG has an arc shape with a central angle of 180°. However, the light guide LG may have an arc shape with a central angle of less than 180°. The light guide LG is formed of a transparent resin member such as acrylic resin or polycarbonate.

At least one of an outer circumferential side and an inner circumferential side of the light guide LG is processed for adjusting the light exit efficiency of the source light from the light guide LG. As a processing technique, various techniques can be adopted such as silk printing processing by which reflecting dots are printed, a molding method for forming projections and depressions by a stamper or injection, and a grooving method.

The emitting direction setting section LE (emitting light exit section) implemented by using the prism sheet PS and the louver film LF is provided on the outer circumferential side of the light guide LG, and receives the source light exiting from the outer circumferential side (the outer circumferential surface) of the light guide LG. Then, the emitting direction setting section LE makes emitting light LT1 and LT2 exit. Emitting directions of the emitting light LT1 and LT2 are set so that the emitting light LT1 and LT2 travel from the inner circumferential side to the outer circumferential side of the curved (arc-shaped) light guide LG. That is, the emitting direction setting section LE sets (regulates) a direction in which the source light travels, the source light existing from the outer circumferential side of the light guide LG, at an emitting direction along the normal direction (radial direction) of the light guide LG. As a result, the emitting light LT1 and LT2 exit radially from the inner circumferential side to the outer circumferential side of the light guide LG.

The above settings of the emitting direction of the emitting light LT1 and LT2 are realized by using the prism sheet PS and the louver film LF of the emitting direction setting section LE. For example, the prism sheet PS makes settings so that the peak of the light exit characteristics coincides with a normal direction by making the direction in which the source light travels, the source light exiting from the outer circumferential side at a low viewing angle, closer to the normal direction. Moreover, the louver film LF blocks (filters out) the light (light with a low viewing angle) travelling in a direction other than the normal direction.

As described above, according to the emission section EU of this embodiment, by providing the light source sections LS1 and LS2 at the ends of the light guide LG and making these light source sections LS1 and LS2 emit light alternately, it is possible to form two emitting light intensity distributions. That is, it is possible to form alternately the emitting light intensity distribution LID1 in which the intensity at one end of the light guide LG is high and the emitting light intensity distribution LID2 in which the intensity at the other end of the light guide LG is high.

By forming these emitting light intensity distributions LID1 and LID2 and receiving the reflected light from the object by reflecting the emitting light having these intensity distributions off the object, it is possible to detect the object with a higher degree of accuracy while minimizing the influence of the ambient light such as the environmental light. That is, it is possible to cancel out an infrared component contained in the ambient light and minimize negative influence of the infrared component on the detection of the object.

3. Display Device and Electronic Equipment

Figure 11A:
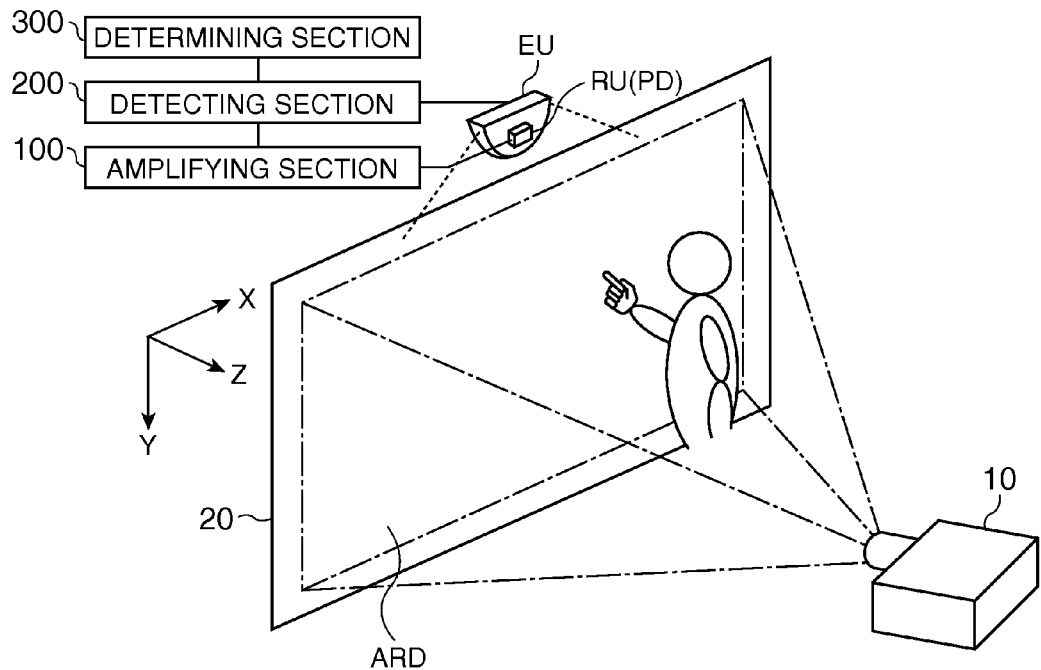
FIGS. 11A and 11B are diagrams showing a basic configuration of a display device or electronic equipment which uses an optical detecting device.
Figure 11B:
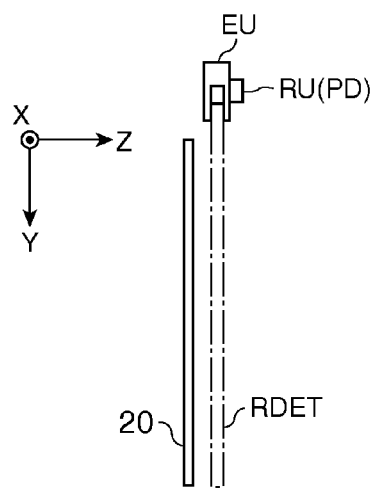

FIGS. 11A and 11B are diagrams showing a basic configuration example of a display device or electronic equipment which uses the optical detecting device of this embodiment. FIGS. 11A and 11B show a case in which the optical detecting device of this embodiment is applied to a liquid crystal projector or a projection display device (projector) called a digital micromirror device. In FIGS. 11A and 11B, intersecting axes are assumed to be an X axis, a Y axis, and a Z axis (in a broad sense, first, second, and third coordinate axes). Specifically, an X-axis direction is a horizontal direction; a Y-axis direction is a vertical direction; and a Z-axis direction is a depth direction.

The optical detecting device of this embodiment includes the emission section EU, the light-receiving section RU (light-receiving element PD), the amplifying section 100, the detecting section 200, and the determining section 300 as mentioned above. Moreover, the display device (electronic equipment) of this embodiment includes an optical detecting device and a screen 20 (in a broad sense, a display section). Furthermore, the display device (electronic equipment) can include an image projecting apparatus 10 (in a broad sense, an image generating apparatus). The configurations of the optical detecting device, the display device, and the electronic equipment of this embodiment are not limited to those of FIGS. 11A and 11B. Various modifications are possible by omitting part of the component elements thereof or adding another component element thereto.

The image projecting apparatus 10 enlarges and projects image display light toward the screen 20 from a projection lens provided on the front-face side of a housing. Specifically, the image projection device 10 generates display light of a color image and emits the display light toward the screen 20 via the projecting lens. As a result, the color image is displayed in a display area ARD of the screen 20.

The optical detecting device of this embodiment optically detects an object such as a user's finger or a touch pen in a detection region RDET which is set on the front side (the Z-axis direction's side) of the screen 20 as shown in FIG. 11B. To detect the object, the emission section EU of the optical detecting device emits emitting light (detection light)

for detecting the object. Specifically, the emission section EU radially emits the emitting light with different intensities (intensities of illumination) in accordance with an emitting direction. As a result, in the detection region RDET, emitting light intensity distribution in which the intensity of the emitting light differs in accordance with the emitting direction is formed. The detection region RDET is a region which is set along the X-Y plane on the Z-axis direction's side (user's side) of the screen 20 (display section).

The light-receiving section RU receives the reflected light by reflecting the emitting light from the emission section EU off the object. The light receiving section RU can be implemented in the form of the light receiving element PD such as a photodiode or a phototransistor. The amplifying section 100 is electrically connected to the light receiving section RU. Though not shown in the drawing, a reference light source section can be provided near the light-receiving section RU.

The amplifying section 100 amplifies the received-light detection signal of the light-receiving element PD and outputs the amplified signal to the detecting section 200 via the coupling capacitor.

The detecting section 200 detects the position identifying information of the object based on the signal output from the amplifying section 100 and outputs the position identifying information to the determining section 300. Moreover, the detecting section 200 performs various types of control processing of the optical detecting device. Specifically, the detecting section 200 performs light emitting control of the light source section and the reference light source section of the emission section EU. The detecting section 200 is electrically connected to the emission section EU.

The determining section 300 determines the position of the object based on the position identifying information output from the detecting section 200. The function of the determining section 300 can be realized by an integrated circuit device, software operating on a microcomputer, and the like.

It is to be understood that the optical detecting device of this embodiment is not limited to the projection display device shown in FIG. 11A. It can be applied to various display devices which are installed in various types of electronic equipment. Moreover, as electronic equipment to which the optical detecting device of this embodiment can be applied, there are various kinds of equipment such as a personal computer, a car navigation device, a ticket vending machine, a handheld terminal, or a banking terminal. Such electronic equipment can include a display section (display device) which displays an image, an input section for inputting information, and a processing section which performs various types of processing based on the input information.

While the embodiments have been described in detail, it will be apparent to those skilled in the art that many modifications are possible unless they substantively depart from the scope of the subject matter and the effect of the invention. Therefore, such modified examples should be construed as being included in the scope of the invention. For example, a term which has been described along with a more comprehensive term or a synonymous term at least one time in the specification or drawings can be replaced with the more comprehensive term or the synonymous term in any location in the specification or drawings. Moreover, it is to be understood that the configurations and operations of the optical detecting device, the display device, and the electronic equipment are not limited to those described in the above embodiments, and may be modified in numerous ways.

What is claimed is:

1. An optical detecting device comprising:
   an emission unit that emits emitting light;
   a light-receiving unit that receives the emitting light reflected off an object;
   an amplifying unit that amplifies a received-light detection signal of the light-receiving unit;
   a detecting unit that outputs position identifying information of the object based on an amplified signal output from the amplifying unit;
   a determining unit that determines a position of the object based on the position identifying information; and
   a coupling capacitor provided between an output node of the amplifying unit and an input node of the detecting unit,
   wherein the detecting unit outputs light-emitting current control information as the position identifying information, and
   a capacitance value of the coupling capacitor is set such that a fluctuation range of the light-emitting current control information becomes a predetermined fluctuation range.

2. The optical detecting device according to claim 1, wherein
   the detecting unit includes a circuit for applying a reverse bias voltage and for setting the reverse bias voltage for the input node.

3. The optical detecting device according to claim 2, wherein
   the light-receiving unit includes a photodiode, and
   the reverse bias voltage is a bias voltage which applies a reverse voltage to the photodiode after the light-receiving unit is connected to the input node.

4. The optical detecting device according to claim 1, wherein
   the predetermined fluctuation range is a fluctuation range in which a detection accuracy with which the object is detected becomes an intended detection accuracy.

5. The optical detecting device according to claim 1, wherein
   the determining unit determines the position of the object based on first-period light-emitting current control information which is the light-emitting current control information in a first period in which the object is not present in a detection region, which is a region in which the object is detected, and based on second-period light-emitting current control information which is the light-emitting current control information in a second period in which the object is present in the detection region.

6. The optical detecting device according to claim 5, wherein the capacitance value of the coupling capacitor is set such that a value of the first-period light-emitting current control information becomes a predetermined value.

7. The optical detecting device according to claim 6, wherein
   the predetermined value is an intermediate value of a fluctuation range of the second-period light-emitting current control information.

8. The optical detecting device according to claim 5, wherein
   the capacitance value of the coupling capacitor is set such that a fluctuation range of the second-period light-emitting current control information becomes a predetermined fluctuation range.

9. The optical detecting device according to claim 8, wherein
   the predetermined fluctuation range is a fluctuation range in which detection accuracy with which the object is detected becomes intended detection accuracy.

10. The optical detecting device according to claim 1, wherein
the amplifying unit includes:
a current-voltage conversion circuit converting a current flowing through the light-receiving unit into a voltage; and
an amplifying circuit amplifying an output signal of the current-voltage conversion circuit around a predetermined bias voltage and outputting the amplified signal to the output node.

11. A display device comprising:
the optical detecting device according to claim 1.

12. Electronic equipment comprising:
the optical detecting device according to claim 1.

13. An optical detecting device comprising:
an emission unit that emits emitting light;
a light-receiving unit that receives the emitting light reflected off an object;
an amplifying unit that amplifies a received-light detection signal of the light-receiving unit;
a detecting unit that outputs position identifying information of the object based on an amplified signal output from the amplifying unit;
a determining unit that determines a position of the object based on the position identifying information; and
a coupling capacitor provided between an output node of the amplifying unit and an input node of the detecting unit,
wherein the determining unit determines the position of the object based on first-period light-emitting current control information which is the light-emitting current control information in a first period in which the object is not present in a detection region, which is a region in which the object is detected, and based on second-period light-emitting current control information which is the light-emitting current control information in a second period in which the object is present in the detection region.

14. The optical detecting device according to claim 13, wherein the capacitance value of the coupling capacitor is set such that a value of the first-period light-emitting current control information becomes a predetermined value.

15. The optical detecting device according to claim 14, wherein
the predetermined value is an intermediate value of a fluctuation range of the second-period light-emitting current control information.

16. The optical detecting device according to claim 13, wherein the capacitance value of the coupling capacitor is set such that a fluctuation range of the second-period light-emitting current control information becomes a predetermined fluctuation range.

17. The optical detecting device according to claim 16, wherein the predetermined fluctuation range is a fluctuation range in which detection accuracy with which the object is detected becomes intended detection accuracy.

18. The optical detecting device according to claim 13, wherein the amplifying unit includes:
a current-voltage conversion circuit converting a current flowing through the light-receiving unit into a voltage; and
an amplifying circuit amplifying an output signal of the current-voltage conversion circuit around a predetermined bias voltage and outputting the amplified signal to the output node.

19. A display device comprising:
the optical detecting device according to claim 13.

20. Electronic equipment comprising:
the optical detecting device according to claim 13.

* * * * *